United States Patent [19]

Roy

[11] Patent Number: 4,865,142

[45] Date of Patent: Sep. 12, 1989

[54] LOAD CARRY CATERPILLAR AND FRONT WHEEL DRIVEN STEERABLE VEHICLE

[76] Inventor: Roch Roy, C.P. 100, Cap-Chat (Québec), Canada, G0J 1E0

[21] Appl. No.: 250,260

[22] Filed: Sep. 27, 1988

[51] Int. Cl.⁴ ............................................. B62D 51/04
[52] U.S. Cl. .................... 180/9.38; 180/9.22; 180/9.25; 180/9.34; 180/19.2
[58] Field of Search .............. 180/9.38, 9.22, 9.25, 180/9.26, 9.36, 252, 253, 254, 21, 19.1, 19.2, 19.3

[56] References Cited

U.S. PATENT DOCUMENTS

| | | | |
|---|---|---|---|
| 2,493,613 | 1/1950 | Bortnick | 180/9.38 |
| 2,770,310 | 11/1956 | Gates | 180/9.38 |
| 3,295,622 | 1/1967 | Pitchford | 180/9.38 |
| 3,789,941 | 2/1974 | Robertson | 180/9.22 |
| 4,645,022 | 2/1987 | Bergquist | 180/9.22 |

Primary Examiner—Charles A. Marmor
Assistant Examiner—Donn McGiehan
Attorney, Agent, or Firm—Foley & Lardner, Schwartz, Jeffery, Schwaab, Mack, Blumenthal & Evans

[57] ABSTRACT

A load-carrying vehicle is disclosed which has a chassis over which a load-carrying bucket or platform is fixed and which is, itself, mounted on a track drive. A motor assembly is mounted at the front of the chassis and the latter further has a bridge structure located ahead of the motor assembly and connected to the chassis while spanning a steering wheel. The latter is mounted on a steerable support actuated by a steering lever which projects rearwardly from the bridge structure over the motor assembly and over the load-carrying bucket or platform. A power transmission connects the motor assembly to the steering wheel and to the track drive so that the two may be operated simultaneously.

11 Claims, 6 Drawing Sheets

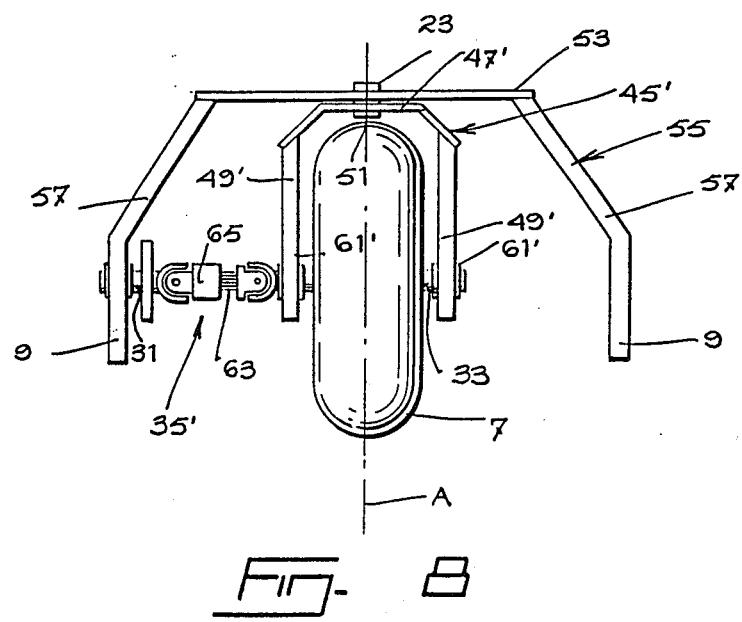

LOAD CARRY CATERPILLAR AND FRONT WHEEL DRIVEN STEERABLE VEHICLE

BACKGROUND OF THE INVENTION

1. Field of the invention

The present invention generally relates to a load-carrying vehicle and more particularly to a cross-country vehicle having a track drive as well as a likewise driving front steering wheel.

2. Background of the invention

The vehicle of the invention is intended for carrying light loads over rough and soggy grounds and is particularly adapted for works in wooded areas although it may also be used at various other places that are hard to reach by standard road vehicles. It is light in weight and low in height so that it can be controlled by an operator who can walk behind it or, if necessary where the ground is too rough or soggy, the operator may stand on a running-board provided at the rear of the vehicle or he may still stand in the load box or platform. Such a vehicle must be of sturdy construction while being inexpensive and safe in use. Its main feature is that it is driven by a track drive and a front wheel drive both simultaneously powered by a motor assembly located between the track and the front wheel so that its weight be applied mostly on the front wheel.

A prior art search was carried out before the filing of the present specification, which search has revealed the following U.S. Pat. Nos.:

2,493,613—1950—Bortnick
2,770,310—1956—Gates
3,295,622—1967—Pitchford
3,789,941—1974—Robertson
4,645,022—1987—Bergquist The most pertinent document appears to be the PITCHFORD patent which discloses a load carrier actuated by a motor coupled to a speed reducer and located behind the load box or bucket. It is steered by twin wheels also situated behind the load box. A reverse action linkage assembly operatively connects the twin steering wheels and a pair of operating handles for pivoting the twin steering wheels in a direction reverse that of the pivoting of the operating handles so that the vehicle turns in a direction which is opposite to the thrust applied by the operator. Apart from the fact that the vehicle turns in a direction which is opposite to the direction applied by the driver, which is awkward, there is little leverage action possible with the type of reverse action linkage used and the relative short distance between the pair of steering handles and the two wheels. Added to this is the use of twins steering wheels, all of which render steering difficult particularly in rough or soggy grounds.

The BERGQUIST patent, on the other hand, relates to a double track drive platform truck but of which steering is obtained by a gear alternatively applying power drive to either one of the two track units in order to steer the vehicle in the desired direction.

As to the ROBERTSON patent, it likewise relates to a light transport vehicle using a twin track drive. Notable in this case however, is the absence of steering wheel or differential track movement, the vehicle being handled by a thrust bar.

The remaining patents have only a remote pertinence and need not be analyzed here.

SUMMARY OF THE INVENTION

The present invention is an improvement of the above noted light transport vehicles, being characterized by the combination comprising: a vehicle chassis having a load-carrying means and track means, respectively above and below the chassis; motor means being mounted on the chassis forwardly of the load-carrying means while a front steering wheel is provided forwardly of the motor means. A bridge structure spans the steering wheel, being secured, at its base, to the chassis. The front wheel is mounted on this bridge structure by steering means to allow the wheel to be steered about a vertical axis; these steering means including a lever for steering the wheel, which lever projects rearwardly from the bridge structure over the motor means and over at least a portion of the load-carrying means. Finally, power transmission means are provided for simultaneously driving the front steering wheel and the track means from the motor means.

The aforesaid power transmission means may comprise a driving shaft having one end rotatably mounted on the chassis while extending in the direction of the steering wheel; a drive shaft mounted on the steering wheel for rotating it; a universal joint interconnecting the drive and driven shafts to drive the wheel into rotation and, finally, a transmission assembly is provided between the motor means, constructed to allow the motor means to drive the drive shaft and the track means simultaneously.

The steering means aforesaid preferably further include an angular support having a horizontal arm and a vertical arm; means mounting the horizontal arm on the bridge structure to allow pivotal movement of the support about the vertical axis aforesaid; bearing means mounting the vertical arm on the driven shaft to allow its rotation independently of the said vertical arm, and additional means securing the forward end of the steering lever solid with the horizontal arm so that swinging of the lever may cause pivoting of the support and steering of the wheel.

According to another embodiment, the steering means may further comprise a fork support having a horizontal central arm and a pair of vertical arms each disposed on one side of the steering wheel, the central arm being mounted on the bridge structure to allow pivotal movement of the fork support about the vertical axis aforesaid while bearing means mount the lateral arms on the driven shaft thus allowing rotation of the driven shaft independently of the lateral arms. Finally, additional means secure the forward end of the steering lever solid with the central arm so that swinging of the lever causes pivoting of the fork support and steering of the wheel.

A description now follows of preferred embodiments of the invention having reference to the appended drawings.

BRIEF DESCRIPTION OF THE DRAWINGS

FIG. 6 is a plan view, partially in cross-section, of the forward part of the vehicle showing the steering wheel set for straight driving while

FIG. 8 is a view similar to that of FIG. 5 but of a second embodiment.

DESCRIPTION OF THE PREFERRED EMBODIMENTS

Figure 1:
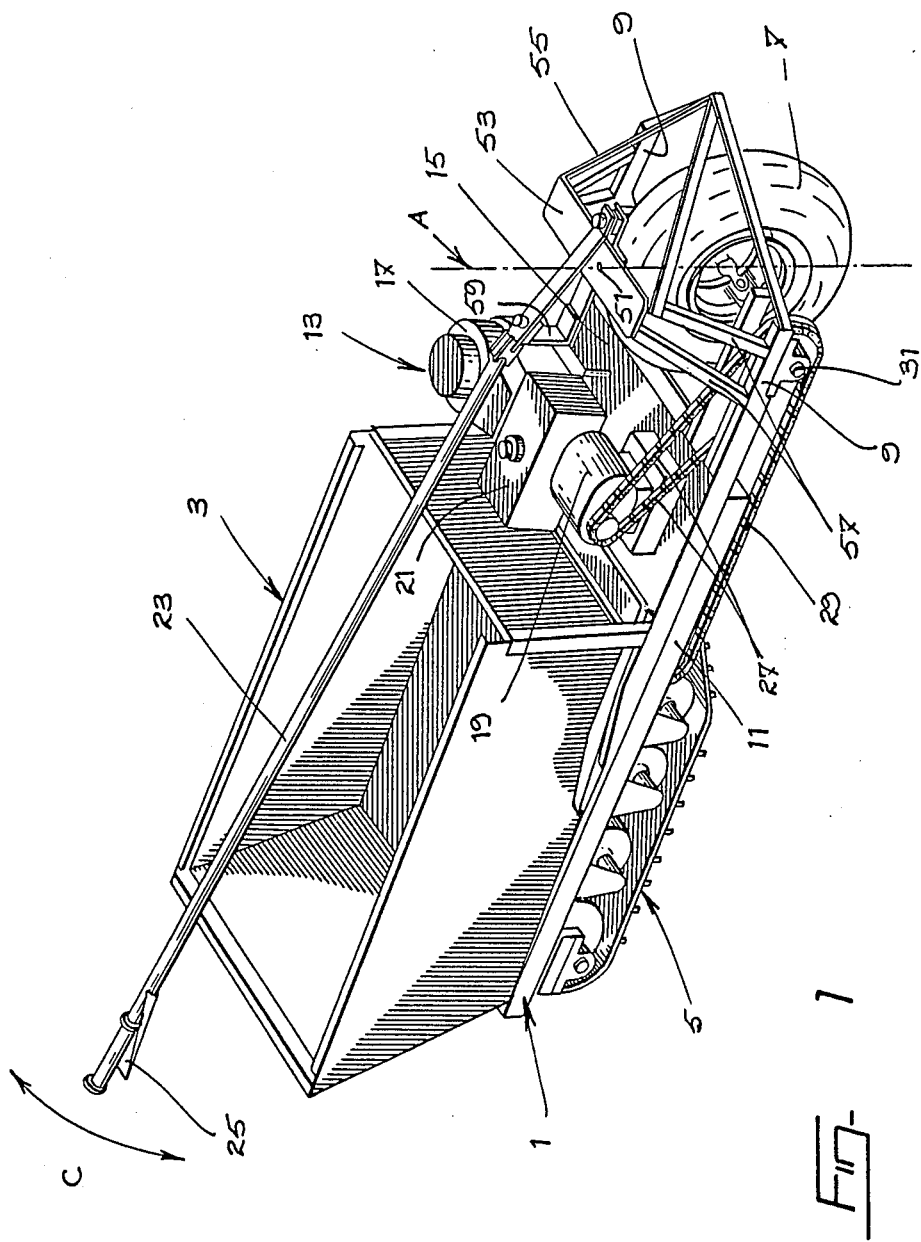
FIG. 1 is a perspective view.
Figure 2:
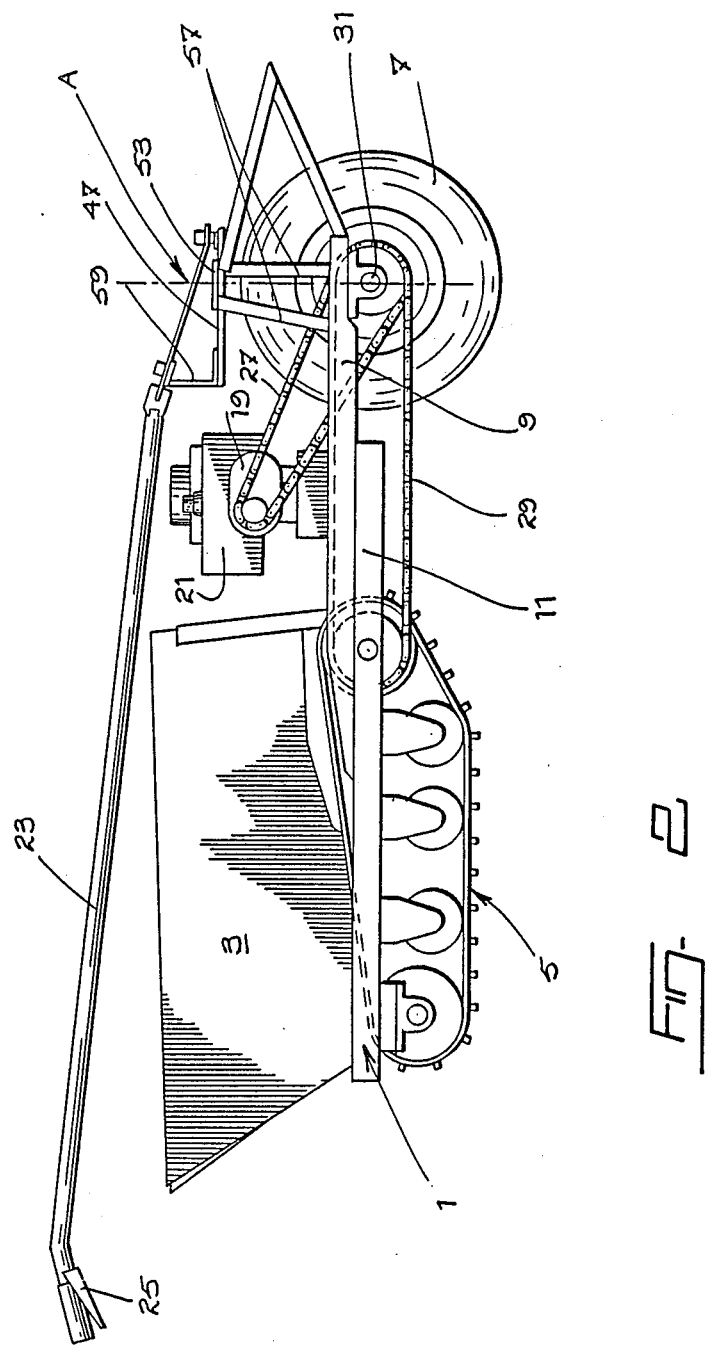
FIG. 2 a side elevation view.
Figure 3:
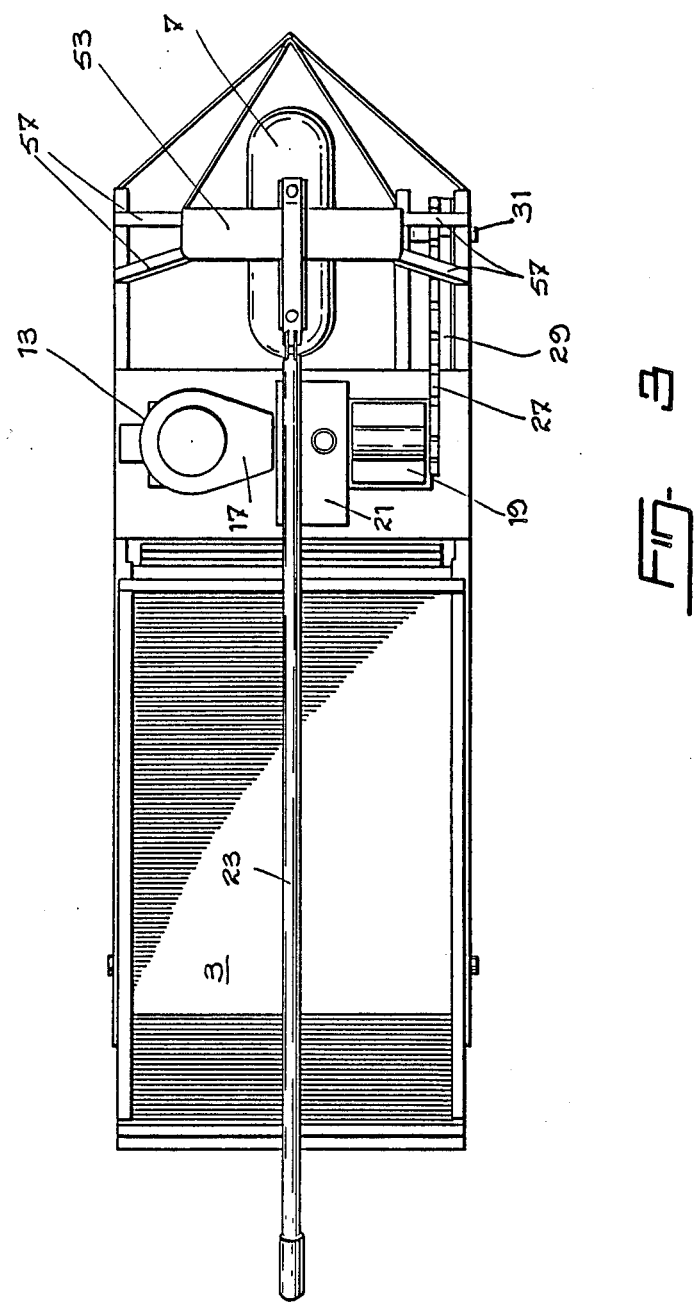
FIG. 3 a top plan view and
FIG. 4 a front view of a load-carrying vehicle made according to the invention.
Figure 4:
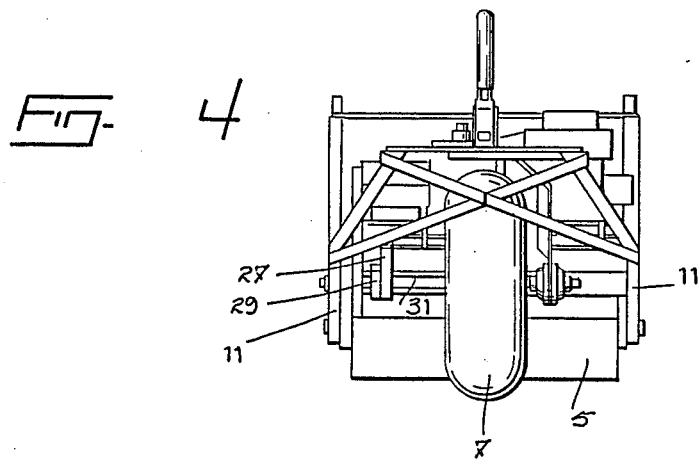

Referring to FIGS. 1 to 4, particularly, the vehicle is shown to be formed of a vehicle chassis 1 over which is secured a load-carrying box 3 which may also be a simple platform or any structure capable of carrying a load. A track assembly 5 is mounted beneath the chassis 1 and may comprise one or two endless track belt units suitable to drive the vehicle on particularly rough and soggy grounds. The box 3 may also be provided, at the rear, with a running board (not shown) on which the operator may stand. A single steering wheel 7 is provided between two front portions 9 of side members 11 of the chassis 1. A motor assembly 13 is set on a transverse plate 15 secured to the side members 11 and located between the box 3 and the steering wheel 7 so that a major part of its weight is carried by the wheel 7. The motor assembly 13 can be conventional and comprises an internal combustion engine 17 coupled to a gear box 19, having several gear-ratios (reverse, neutral and 4 or 5 forward drives). A friction clutch 21 would be disposed between the motor assembly 13 and the gear box 19 for power transmission. Pivoting of the wheel 7 about a vertical axis A, through its center, is obtained by a steering mechanism, to be described fully hereinbelow, involving an elongated steering lever 23 projecting rearwardly over the motor assembly 13 and over at least a portion of the box 3, preferably extending beyond the box 3 as shown so as to be operable from outside of it.

It will be appreciated that the steering lever 23 may also be actuated from within the box 3. The clutch 21 may be controlled from a pivotable handle 25 at the rear end of lever 23 through any suitable mechanical linkage system; the handle 25 being normally biassed to inoperative position of the vehicle. In this inoperative position, the engine 17 may not transmit power to the track and front wheel drives and a brake, mounted in the clutch 21, is automatically actuated to prevent movement of the vehicle.

Power transmission is through a conventional transmission means including belt-and-sheave or sprocket-and-chain arrangements 27, 29, involving a drive shaft 31, so that both the track and steering wheel drives may be driven simultaneously; the wheel 7 being made to rotate about a horizontal axis B, as will further be explained hereinbelow. The drive shaft 31 of the power transmission mechanism is mounted on the front portion 9 of one of the side members 11 of the chassis 1 to extend in the direction of the steering wheel 7. It is connected to a driven shaft 33, on which the wheel 7 is mounted for rotation, through a conventional universal joint 35 of which the center coincides with the center of the wheel 7.

Figure 6:
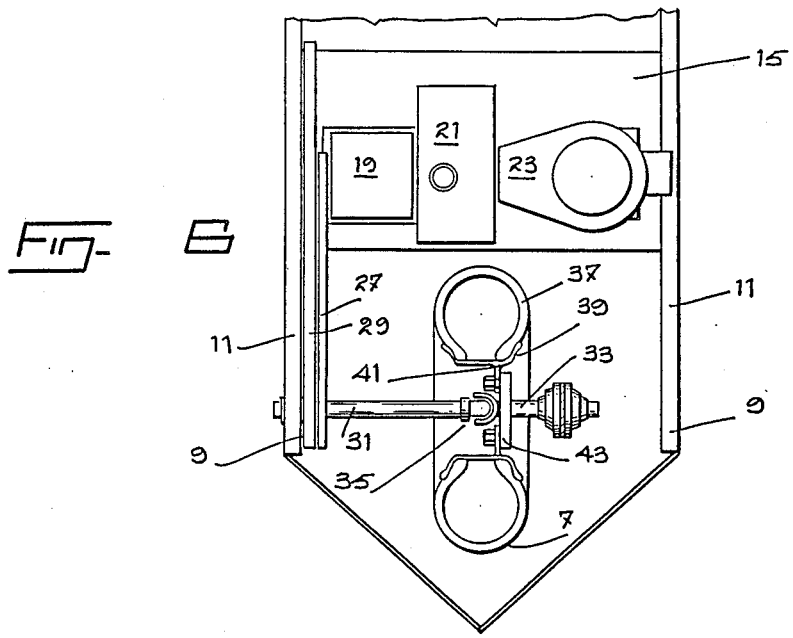
Figure 7:
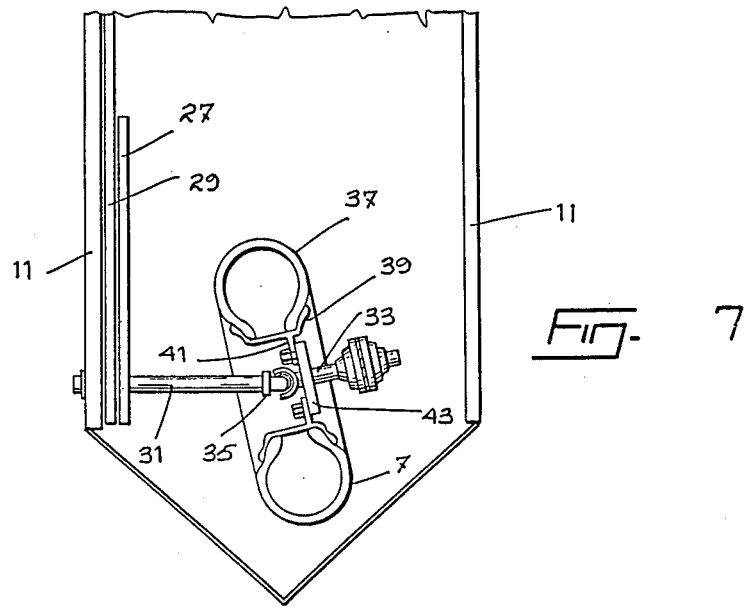
FIG. 7 is a similar view showing the steering wheel pivoted for a leftward turn.

Referring to FIGS. 6 and 7, the steering wheel 7 has a pneumatic tire 37 mounted on a rim 39 defining an annular flange 41 to which is secured a hub plate 43 fixed to the driven shaft 33.

Through this power transmission means 27, 29, 31, 33 and 35, the steering wheel 7 may be kept rotating regardless of its orientation about the vertical axis A.

Figure 5:
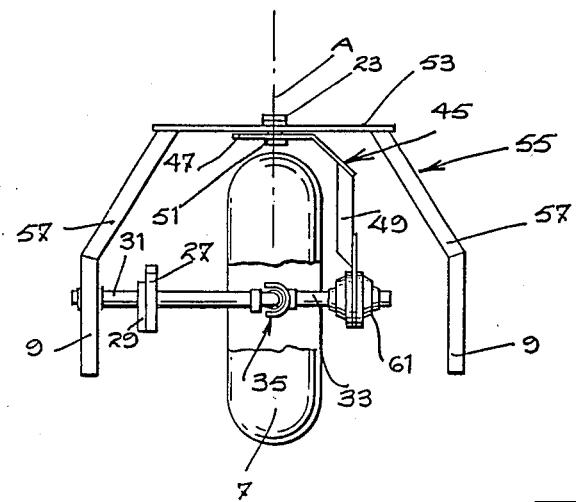
FIG. 5 is a diagrammatic partial front view.

Apart from the steering lever 23 aforesaid, the steering mechanism includes an angular wheel support 45 (see FIG. 5 particularly) having a horizontal arm 47 and a vertical arm 49. Arm 47 is mounted for pivotal movement about the previously mentioned vertical axis A (FIG. 1)(intersecting the center of the wheel 7) by means of a pivot joint 51 extending freely through the flat central part 53 of a bridge structure 55 having side struts 57 securing the said central part 53 to the side members 11 of the chassis 1; the bridge structure 55 thus spanding the wheel 7. The pivot joint 51 can thus freely rotate with respect to the central part 53 and is otherwise fixed to the horizontal arm 47. The latter is a cruciform element (FIG. 1) of which the transverse member is fixed to the pivot joint 51; the forward end of the longitudinal member is secured to the forward end of the steering lever 23 and the rearward end is fixed to a U-shaped connector 59 also fixed to the steering lever 23. With this steering arrangement, swinging of the steering arm 23, along arrow C in FIG. 1, causes pivotal movement of the support 45 (FIG. 5) about the vertical axis A.

The lower end of the vertical arm 49 is provided with a bearing device 61 through which the driven shaft 33 freely extends and by which it is supported along with the wheel 7. Thus pivotal movement of the angular support 45, when lever 23 is actuated, causes steering of the rotating front drive wheel 7, as shown in FIGS. 6 and 7.

In the embodiment of FIG. 8, the steering wheel support has the shape of a fork 45' having a horizontal central arm 47' and a pair of vertical lateral arms 49' each disposed on one side of the wheel 7. Here again a pivot 51, fast with the central arm 47' solid with the steering lever 23, mounts both on the bridge structure central part 53 for pivotal movement of the fork support 45' about the vertical axis A whenever the lever 23 is steered. The lower ends of the lateral arms 49' have bearings 61' through which the driven shaft 33 journals. The latter is connected to the drive shaft 31 through a double universal connection 35' of which the central part comprises a longitudinally crenelated shaft 63 fixed to one joint and slidable in a cooperating crenelated bore of a sleeve 65 of the other joint. Since the center of the connection 35 is not located at the center of the wheel, as in the previous embodiment, the arrangement 63, 65, is necessary to provide for variation in the distance between shafts 31 and 33 when the wheel 7 is steered.

Finally, an essentially pyramidal-shaped bumper frame 67 is provided at the front end of the chassis 1 to facilitate manoeuvering of the vehicle through bushy and wooded areas. As shown, its base is fixed both to the front portions 9 of the chassis 1 and to the struts 57 of the bridge 55.

I claim:
1. A load-carrying vehicle comprising:
a vehicle chassis and a load-carrying means on said chassis;
track means mounted on and beneath said chassis;
motor means mounted on said chassis forwardly of said load-carrying means;
a front steering wheel forwardly of said motor means;
a bridge structure solid, at the base thereof, with said chassis and spanning said steering wheel;
steering means mounting said front wheel on said bridge structure for steeringly pivoting said wheel about a vertical axis; said steering means including a steering lever for steering said wheel; said steering lever projecting rearwardly from said bridge structure over said motor means and over at least a portion of said load-carrying means; and power transmission means for simultaneously driving said front steering wheel and said track means from said motor means.

2. A load-carrying vehicle as claimed in claim 1, wherein said power transmission means comprise:

a driving shaft having one end rotatably mounted on said chassis and extending in the direction of said steering wheel;

a driven shaft and means mounting said driven shaft on said steering wheel;

universal joint means interconnecting said drive and driven shafts to drive said wheel into rotation; and a transmission assembly between said motor means, said drive shaft and said track means, constructed to allow said motor means to drive said drive shaft and track means simultaneously.

3. A load-carrying vehicle as claimed in claim 2, wherein said steering means further comprise:

an angular support having a horizontal arm and a vertical arm;

means mounting said horizontal arm on said bridge structure for pivotal movement of said support about said vertical axis;

bearing means mounting said vertical arm on said driven shaft for allowing rotation of said driven shaft independently of said vertical arm, and means securing the forward end of said steering lever solid with said horizontal arm whereby swinging of said lever causes pivoting of said support and steering of said wheel.

4. A load-carrying vehicle as claimed in claim 3, wherein said bearing means are located on one side of said steering wheel and said universal joint means have a center coinciding with that of said steering wheel.

5. A load-carrying vehicle as claimed in claim 2, wherein said steering means further comprise:

a fork support having a horizontal central arm and a pair of vertical lateral arms each disposed on one side of said steering wheel;

means mounting said central arm on said bridge structure for pivotal movement of said fork support about said vertical axis;

bearing means mounting said lateral arms on said driven shaft for allowing rotation of said driven shaft independently of said lateral arms;

means securing the forward end of said steering lever solid with said central arm whereby swinging of said lever causes pivoting of said fork support and steering of said wheel.

6. A load-carrying vehicle as claimed in claim 5, wherein said bearing means comprise a pair of bearing members each mounted at the lower end of one of said lateral arms.

7. A load-carrying vehicle as claimed in claim 6, wherein said universal joint means are located on one side of said wheel fork support.

8. A load-carrying vehicle as claimed in claim 3, wherein said chassis comprises a pair of spaced side members having portions extending forwardly of said motor means and wherein said angular support, said drive and driven shafts, said universal joint means and said steering wheel are located between said portions.

9. A load-carrying vehicle as claimed in claim 5, wherein said chassis comprises a pair of spaced side members having portions extending forwardly of said motor means and wherein said fork support, said drive and driven shafts, said universal joint means and said steering wheel are located between said portions.

10. A load-carrying vehicle as claimed in claim 8, further comprising an essentially pyramidal-shaped bumper frame of which the base thereof is secure to the ends of said forwardly extending portions of said chassis side members and to said bridge structure.

11. A load-carrying vehicle as claimed in claim 9, further comprising an essentially pyramidal-shaped bumper frame of which the base thereof is secured to the ends of said forwardly extending portions of said chassis side members and to said bridge structure.

* * * * *